(12) United States Patent
Paul

(10) Patent No.: US 11,412,014 B1
(45) Date of Patent: Aug. 9, 2022

(54) SYSTEMS AND METHODS FOR INTEGRATED AUDIOCONFERENCING

(71) Applicant: Meta Platforms, Inc., Menlo Park, CA (US)

(72) Inventor: Debashish Paul, Sunnyvale, CA (US)

(73) Assignee: Meta Platforms, Inc., Menlo Park, CA (US)

( * ) Notice: Subject to any disclaimer, the term of this patent is extended or adjusted under 35 U.S.C. 154(b) by 0 days.

(21) Appl. No.: 17/128,753

(22) Filed: Dec. 21, 2020

(51) Int. Cl.
*H04L 29/08* (2006.01)
*H04L 65/403* (2022.01)
*H04L 65/61* (2022.01)
*H04L 51/52* (2022.01)
*H04M 3/56* (2006.01)

(52) U.S. Cl.
CPC ............ *H04L 65/403* (2013.01); *H04L 51/32* (2013.01); *H04L 65/4069* (2013.01); *H04M 3/563* (2013.01)

(58) Field of Classification Search
None
See application file for complete search history.

(56) References Cited

U.S. PATENT DOCUMENTS

| | | | | |
|---|---|---|---|---|
| 10,284,812 | B1* | 5/2019 | Van Os | H04N 7/147 |
| 2012/0271957 | A1* | 10/2012 | Carney | G06Q 10/107 |
| | | | | 709/228 |
| 2016/0182576 | A1* | 6/2016 | Kromnick | H04W 4/70 |
| | | | | 709/204 |
| 2018/0309801 | A1* | 10/2018 | Rathod | H04L 65/1069 |
| 2018/0357484 | A1* | 12/2018 | Omata | G06V 20/582 |
| 2018/0367483 | A1* | 12/2018 | Rodriguez | H04L 51/04 |
| 2018/0367484 | A1* | 12/2018 | Rodriguez | G06Q 10/101 |

OTHER PUBLICATIONS

Lefebvre, Rob, "Loomie Puts an Animated 3D Avatar Into YourZoom Calls", URL: https://www.lifewire.com/loomie-puts-animated-3d-avatar-into-your-zoom-calls-4843385, Apr. 28, 2020, pp. 1-9.
Sawers, Paul, "MapChat: The location-based instant messaging app forstrangers", URL: https://thenextweb.com/apps/2011/08/25/mapchat-the-location-based-instant-messaging-app-for-strangers/, Aug. 25, 2011, pp. 1-6.

* cited by examiner

*Primary Examiner* — Natisha D Cox
(74) *Attorney, Agent, or Firm* — FisherBroyles, LLP

(57) ABSTRACT

Systems and methods for integrated audioconferencing social media music streaming may include (1) detecting that a user of a messaging application, which enables audioconferencing between its users, has selected a drop-in mode that enables audioconferencing between (i) the user and (ii) other users with access to a drop-in link corresponding to the user, (2) providing the drop-in link to contacts of the user in a messaging interface of the messaging application, and (3) in response to determining that a contact of the user has selected the drop-in link, automatically initiating an audioconference between the user and the contact. Various other methods, systems, and computer-readable media are also disclosed.

20 Claims, 8 Drawing Sheets

SYSTEMS AND METHODS FOR INTEGRATED AUDIOCONFERENCING

BRIEF DESCRIPTION OF THE DRAWINGS

The accompanying drawings illustrate a number of exemplary embodiments and are a part of the specification. Together with the following description, these drawings demonstrate and explain various principles of the present disclosure.

Figure 1:
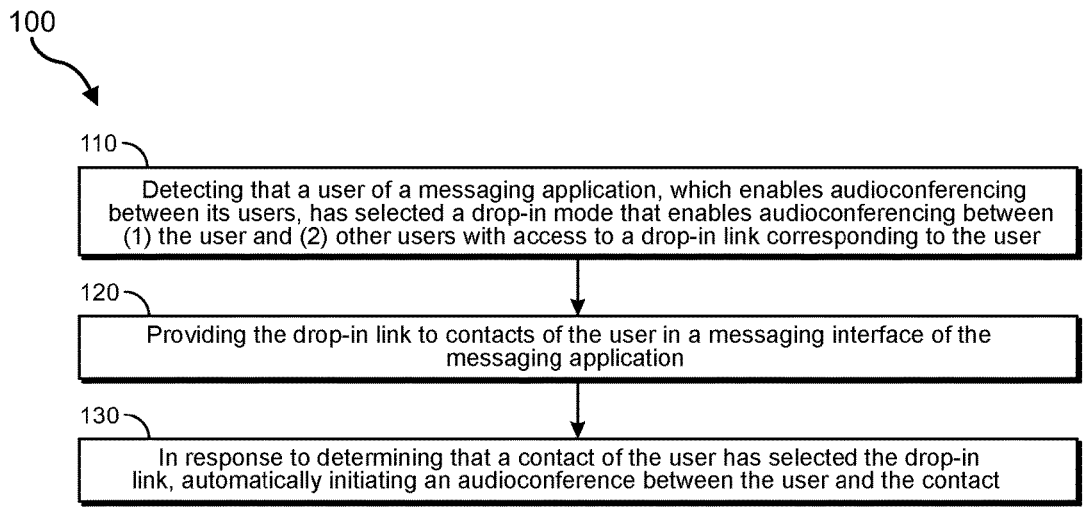
FIG. 1 is a flow diagram of an exemplary method for enabling link-triggered audioconferencing via a messaging application.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the present disclosure covers all modifications, equivalents, and alternatives falling within the scope of the appended claims.

DETAILED DESCRIPTION OF EXEMPLARY EMBODIMENTS

The present disclosure identifies a need for systems and methods that enable users to digitally "drop in" on one another, virtually mimicking the spontaneity of exchange afforded by real-world spaces, such as the lobby of a library and/or an office. In some examples, a user of a messaging application, which enables audioconferencing, may select a "drop-in mode" (i.e., a "headphone mode") that enables other users to be directly joined into an audioconference with the user (as if the contact were "dropping in" to the user's headphones). In these examples, when a user of the messaging application selects the drop-in mode (e.g., via input to a settings interface), a drop-in graphic (e.g., a graphic of a headphone) may appear by the user's profile within a messaging interface (e.g., a contacts list) presented to the user's contacts. If the drop-in graphic is selected by a contact, the contact may be directly joined into an audioconference with the user in response (e.g., may be "dropped in" to the user's headphones). The direct joining may occur without any additional input from the user and/or contact (beyond the contact's selection of the drop-in graphic). For example, the direct joining may occur without first presenting the user with an interface indicating that the contact would like to audioconference with the user and/or requesting that the user accept to audioconference with the contact.

If multiple contacts select the drop-in graphic, a group audioconference may be initiated. In some examples, audio (e.g., music and/or a podcast) being listened to by the user, via the device on which the user is logged into the messaging application, may be shared with contacts added to the audioconference. In these examples, such audio sharing may promote the sense that the contacts are being dropped into the user's headphones. In certain embodiments, the disclosed systems and methods may enable user's participating in an open audioconference to transition the audioconference to a videoconference (e.g., via user input to an interface associated with the audioconference). In some examples, a digital video room may be created for the user corresponding to digital exchanges occurring via the drop-in mode.

As will be explained in greater detail below, embodiments of the present disclosure may improve the field of videotelephony by facilitating digital access to media conferences (e.g., reducing the number of interfaces required for an audioconference and/or videoconference to be initiated and/or for users to be added to an audioconference and/or videoconference). This may in turn improve the functioning of a computer itself by reducing the resources required to perform a task (e.g., to initiate and/or add users to an audioconference and/or videoconference).

The following will provide, with reference to FIG. 1, detailed descriptions of computer-implemented methods for integrated audioconferencing. Detailed descriptions of corresponding example systems will also be provided in connection with FIG. 2. Detailed descriptions of corresponding interfaces and embodiments will be provided in connection with FIGS. 3-9.

FIG. 1 is a flow diagram of an exemplary computer-implemented method 100 for integrated audioconferencing (e.g., audioconferencing integrated with a messaging application). The steps shown in FIG. 1 may be performed by any suitable computer-executable code and/or computing system, including the system(s) illustrated in FIG. 2. For example, the steps shown in FIG. 1 may be performed by modules operating in a server 202 and/or modules operating in a user device 204 (e.g., as shown in exemplary system 200 in FIG. 2). In one example, each of the steps shown in FIG. 1 may represent an algorithm whose structure includes and/or is represented by multiple sub-steps, examples of which will be provided in greater detail below.

Server 202 generally represents any type or form of backend computing device that may perform one or more functions directed at social networking. The term "social networking" may refer to any type or form of digital communication that occurs between users of a platform via an interface of the platform (e.g., text-based communication, videoconferencing and/or audioconferencing, public content posting, etc.). In some examples, server 202 may operate in connection with a social networking platform 206. Although illustrated as a single entity in FIG. 2, server 202 may include and/or represent a group of multiple servers that operate in conjunction with one another.

User device 204 generally represents any type or form of computing device capable of reading computer-executable instructions. For example, user device 204 may represent a smart phone and/or a tablet. Additional examples of user device 204 may include, without limitation, a laptop, a desktop, a wearable device, a personal digital assistant (PDA), etc.

In some examples, a user 208 of user device 204 may be a member of social networking platform 206. In these examples, user device 204 may have installed an instance of a social networking application, which may operate as part of social networking platform 206 and through which one or more services provided via server 202 may be accessible. Additionally or alternatively, user device 204 may have installed a browser that may navigate to one or more webpages maintained by social networking platform 206, through which one or more services provided via server 202 may also be accessible. In some examples, the social networking application may represent and/or include a messaging application 210 and/or may enable access to a messaging service of social networking platform 206.

Social networking platform 206 may provide a variety of services for the users within its network (e.g., via server 202 and/or a social networking application such as messaging application 210). In one example, social networking platform 206 may provide a newsfeed service. The term "newsfeed" may generally refer to any type or form of social media consumption channel that presents a scrollable collection of newsfeed posts. In some examples, a newsfeed may scroll (e.g., upward or downward) to reveal different posts within the newsfeed, in response to receiving user scrolling input. In one example, the scrollable collection may include a collection of newsfeed posts created by contacts of a particular user (e.g., friends of the particular user). The term "newsfeed post" generally refers to any type or form of digital composition that may be displayed in a newsfeed. Newsfeed posts may include, without limitation, text-based compositions, media-based compositions (which may include either a single media item or a collage of multiple media items), and/or a link to an online article. The newsfeed service may enable viewers of a newsfeed post to comment on the newsfeed post, via a text and/or image-based reply, creating a digital thread of comments.

As another example, social networking platform 206 may provide a digital story service. The digital story service may provide users with a story consumption channel, which presents a continuous series of digital story posts to a story-consumer, one by one. The term "digital story post" may generally refer to any type or form of social media post intended for a story consumption channel. A digital story composition may include a variety of content (e.g., a digital photograph, a graphic, text, a digital video and/or a digital recording of a music composition). In one example, the story consumption channel may transition from presenting one digital story post to the next automatically, without requiring any user input to do so. In some examples, digital story posts from a same source (e.g., created and/or posted by a same user) may be grouped together within the story consumption channel, such that each digital story post from a particular source is displayed prior to displaying digital story posts from another source. In one embodiment, a digital story post may be ephemeral. That is, the digital story post may only be viewable for a predetermined amount of time. For example, a digital story composition may be set to disappear after twenty-four hours. Similar to the newsfeed service, the digital story service may enable viewers of a story post to comment on the post, via a text and/or image-based reply and/or reply story, creating a digital thread of comments.

Figure 3:
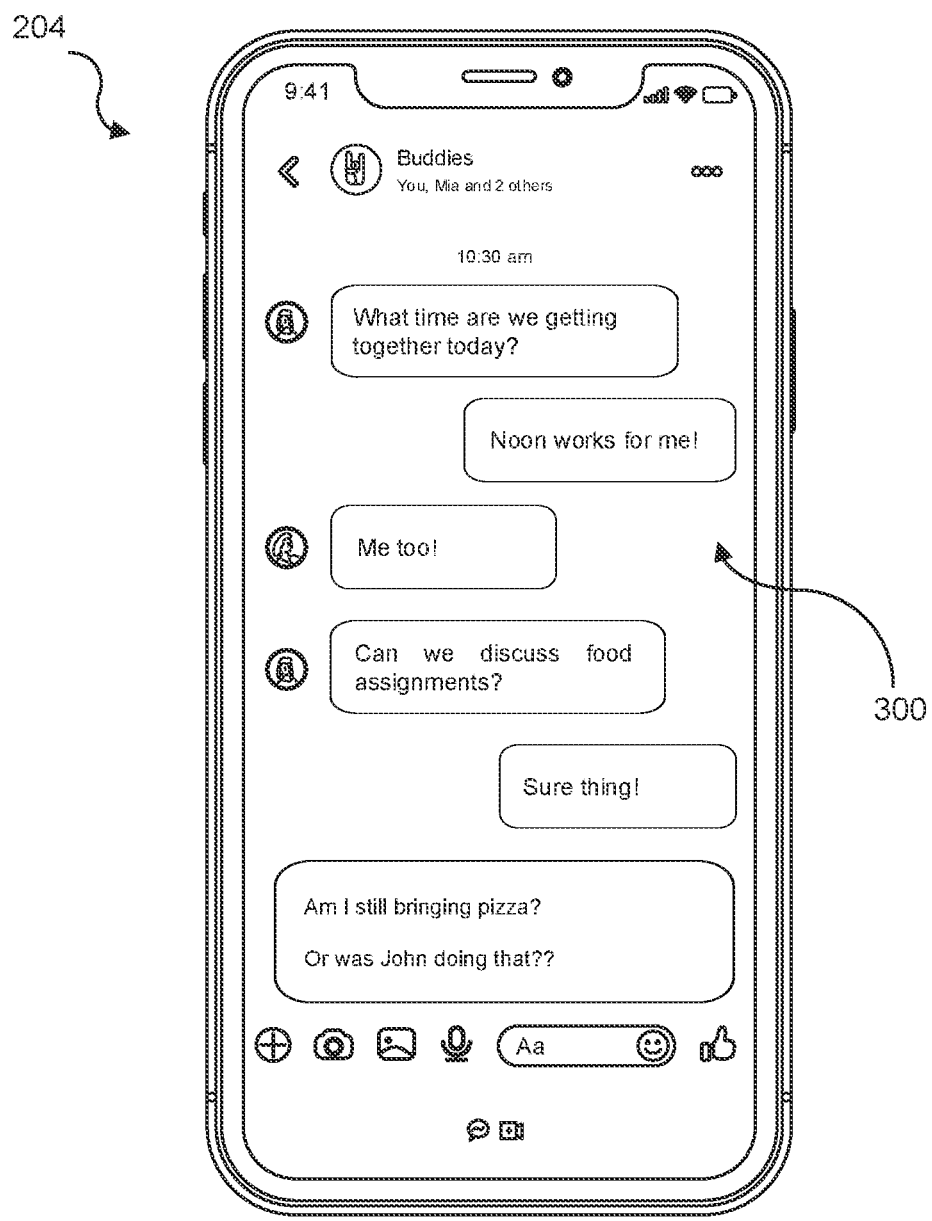
FIG. 3 is an illustration of an exemplary group messaging interface of a messaging application.
Figure 4:
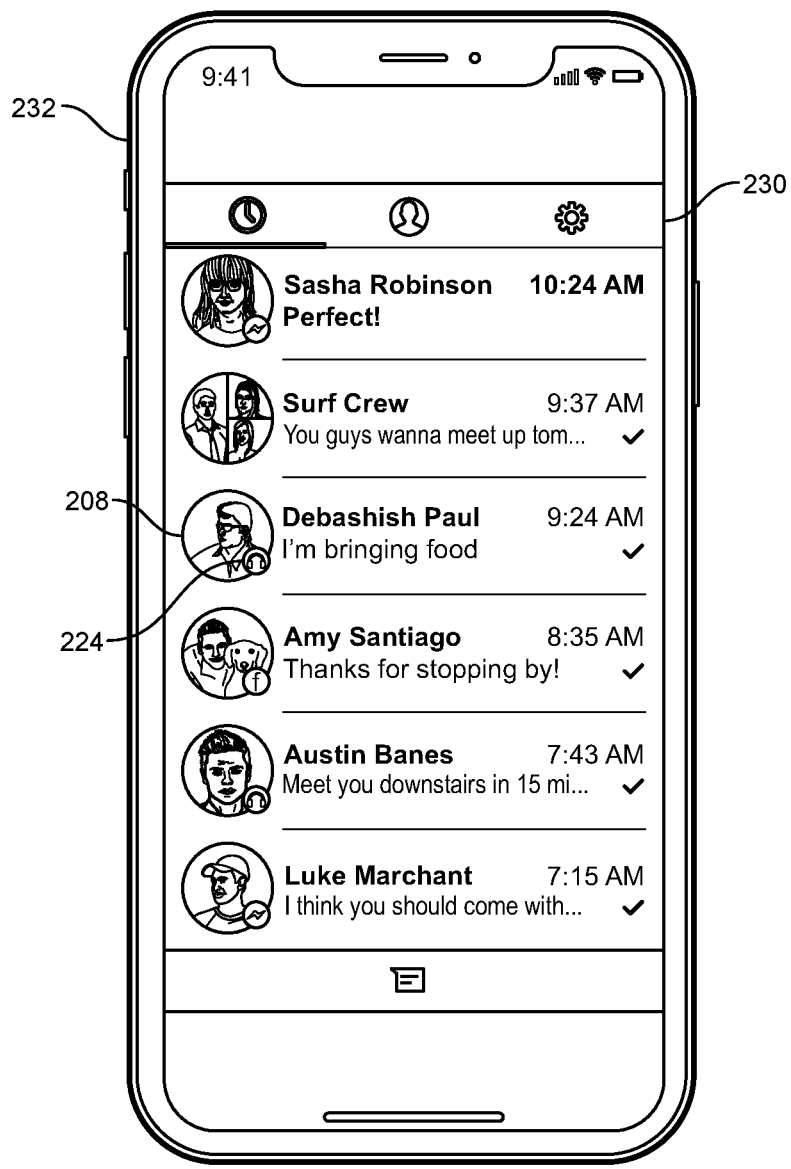
FIG. 4 is an illustration of an exemplary contact list interface of a group messaging application.

As another example, social networking platform 206 may provide a messaging service (e.g., accessible via a messaging application such as messaging application 210). The term "messaging service" may generally refer to any type or form of digital message delivery system that enables users of social networking platform 206 to exchange messages (e.g., text messages and/or group chats) within a private and/or public message thread. FIG. 3 depicts an exemplary private message thread 300 of messages exchanged between a group of users. These messages may include a variety of content (e.g., text, links, live videos, voice recordings, etc.). In some examples, the messaging service may provide a user with a contact list (e.g., as depicted in FIG. 4) of contacts with whom the user may message. In some examples, the messaging service may (e.g., in addition to enabling text-based exchanges) enable audioconferencing and/or videoconferencing between users of the messaging service. Additionally or alternatively, the messaging service may be integrated with an additional service that enables audioconferencing and/or videoconferencing for users of the messaging service.

In some examples, social networking platform 206 may provide a digital conferencing service (e.g., a videoconferencing and/or audioconferencing service). In these examples, the digital conferencing service may operate as a stand-alone service and/or may be integrated with another service (e.g., a messaging service, a newsfeed service, a digital story service, etc.). The term "digital conferencing service" generally refers to any type or form of communications framework that enables audioconferencing and/or videoconferencing (e.g., via an audio and/or video call) between two or more users. In some examples, the digital conferencing service may enable the digital transmission and/or sharing of real-time media streams (e.g., real-time audio streams and/or video streams) from multiple endpoints via a live conferencing interface. The term "real-time media stream" generally refers to any type or form of media (e.g., audio and/or video) that is transmitted in real-time from an endpoint (i.e., transmitting device) to one or more additional endpoints.

In some examples, a digital conferencing service provided by social networking platform 206 may facilitate persistent and/or asynchronous communication, in addition to facilitating ephemeral and/or real-time communication. In some such examples, the digital conferencing service may create and maintain digital video rooms for its users (configured to facilitate videoconferencing and/or audio-only conferencing). The term "digital video room" may refer to a set of one or more interfaces that include a group streaming space for live videoconferencing. In some examples, the interfaces of a digital video room may be persistent. That is, the interfaces may not expire automatically (e.g., in response to a videoconference ending).

Figure 2:
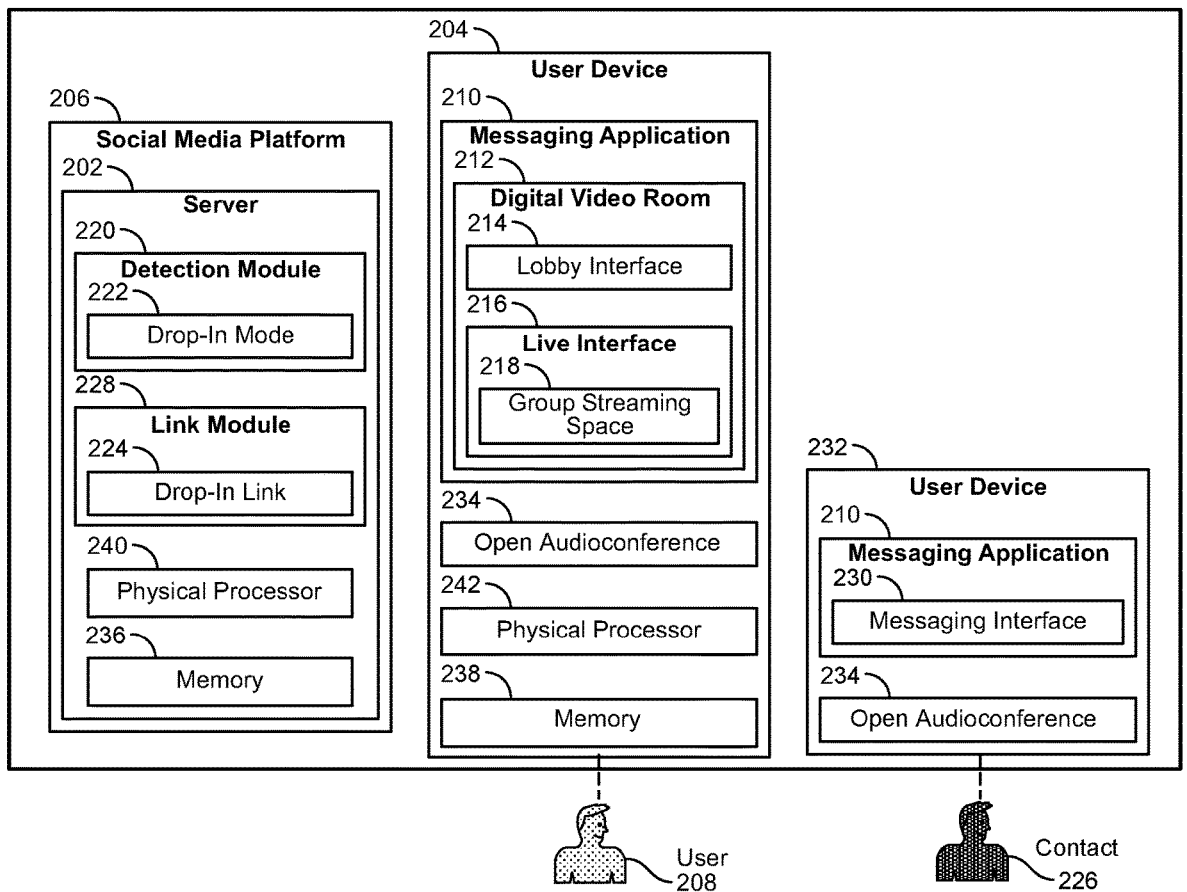
FIG. 2 is a block diagram of an exemplary system for enabling link-triggered audioconferencing via a messaging application.

In some embodiments, a digital video room may be configured to alternate between a lobby state, provided via a lobby interface, and a live state, provided via a live interface. FIG. 2 depicts a digital video room 212 with a lobby interface 214 and a live interface 216. The lobby state (accessible via lobby interface 214) may enable asynchronous digital exchanges between users of a group corresponding to digital video room 212. The live state (accessible via live interface 216) may enable synchronous videoconferencing and/or audio-only conferencing between the users of the group.

Figure 5:
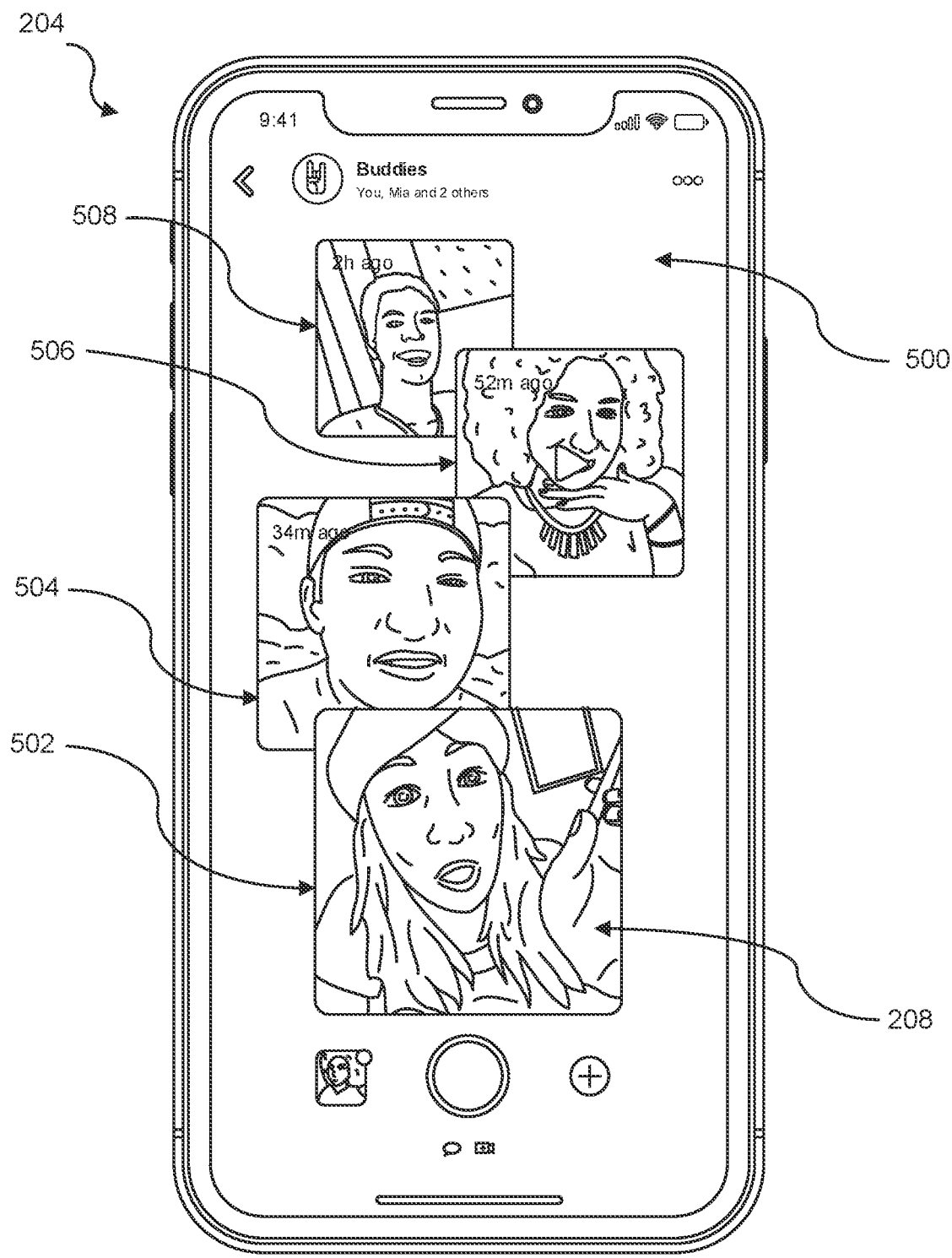
FIG. 5 is an illustration of an exemplary lobby interface of a digital video room.

Lobby interface 214 may be configured in a variety of ways and may provide a variety of features directed to asynchronous communication. In some examples, lobby interface 214 may include a home screen (e.g., a default landing screen) that displays a user tile for each user in the group of users corresponding to digital video room 212. FIG. 5 illustrates an exemplary embodiment of a lobby home screen 500 with user tiles 502, 504, 506, and 508.

Each user tile within a lobby home screen may present a variety of content. For example, a user tile may present a thumbnail of a digital artifact left by a user, such as a video message, an audio message, and/or an avatar message (e.g., a message delivered by an animated graphical representation of the user that moves in sync with an audio recording of the user). Additionally or alternatively, a user tile may include a user's activity status delineating the status of the user with regards to digital video room 212 (e.g., "watching," "offline," "in live videoconference," etc.). In some examples, a user tile may include a presence snapshot. The presence snapshot may represent a snapshot of a camera frame (e.g., a last camera frame) from a user's most recent live video appearance to digital video room 212. In one example, a user tile may include a music player associated with the user with a link to music associated with the user (e.g., being currently listened to by the user and/or posted to the group by the user). Additionally or alternatively, a user tile may include a graphic (e.g., a doodle drawn by a user), a profile image, and/or a user-generated poll. In some examples, each user tile may include a timestamp of the last time the user tile's corresponding user visited digital video room 212 (e.g., the last time the user visited any interface of digital video room 212, the last time the user visited lobby interface 214, and/or the last time the user visited live interface 216).

A lobby home screen may arrange user tiles in any configuration. FIG. 5 depicts an embodiment in which user tiles are vertically staggered with the tile corresponding to user 208 (i.e., the user to whom the interface is being displayed) being displayed as the bottom most tile and the remaining ascending order being based on a recency metric. In one embodiment, a lobby home screen may only include one user tile for each user of digital video room 212. In this embodiment, non-current (e.g., archived) user tiles may be stored and accessible via a tile-archive screen of lobby interface 214.

In some examples, digital video room 212 may be configured to promote serendipitous meetings via lobby interface 214 that may organically lead to live exchanges (e.g., via live interface 216). For example, digital video room 212 may inform a user accessing lobby interface 214 (e.g., viewing and/or creating content via lobby interface 214), via a digital alert in lobby interface 214, of other users accessing lobby interface 214, enabling and/or prompting users accessing lobby interface 214 at the same time to initiate a live exchange.

Live interface 216 may be configured in a variety of ways and may provide a variety of live audioconferencing and/or videoconferencing features. In one of its most basic implementations, live interface 216 may represent and/or include a group streaming space 218 that enables users participating in a live media conference to transmit live media streams (e.g., a live video stream and/or a live audio stream). In some examples, group streaming space 218 may display each live user stream within a dynamic user tile.

In one embodiment, dynamic user tiles may change positions within group streaming space 218 based on an activity metric (e.g., who is speaking, who has begun speaking who was previously not speaking, a volume at which a user is speaking, a type of speech being produced by a user such as laughter, shouting, or whispering, who has recently joined group streaming space 218, and/or an amount that a user has spoken). As a specific example, the dynamic user tile of a user who has begun speaking may be moved to a position that is more prominent within live interface 216 than the dynamic user tile of a user who is not speaking.

Figure 6:
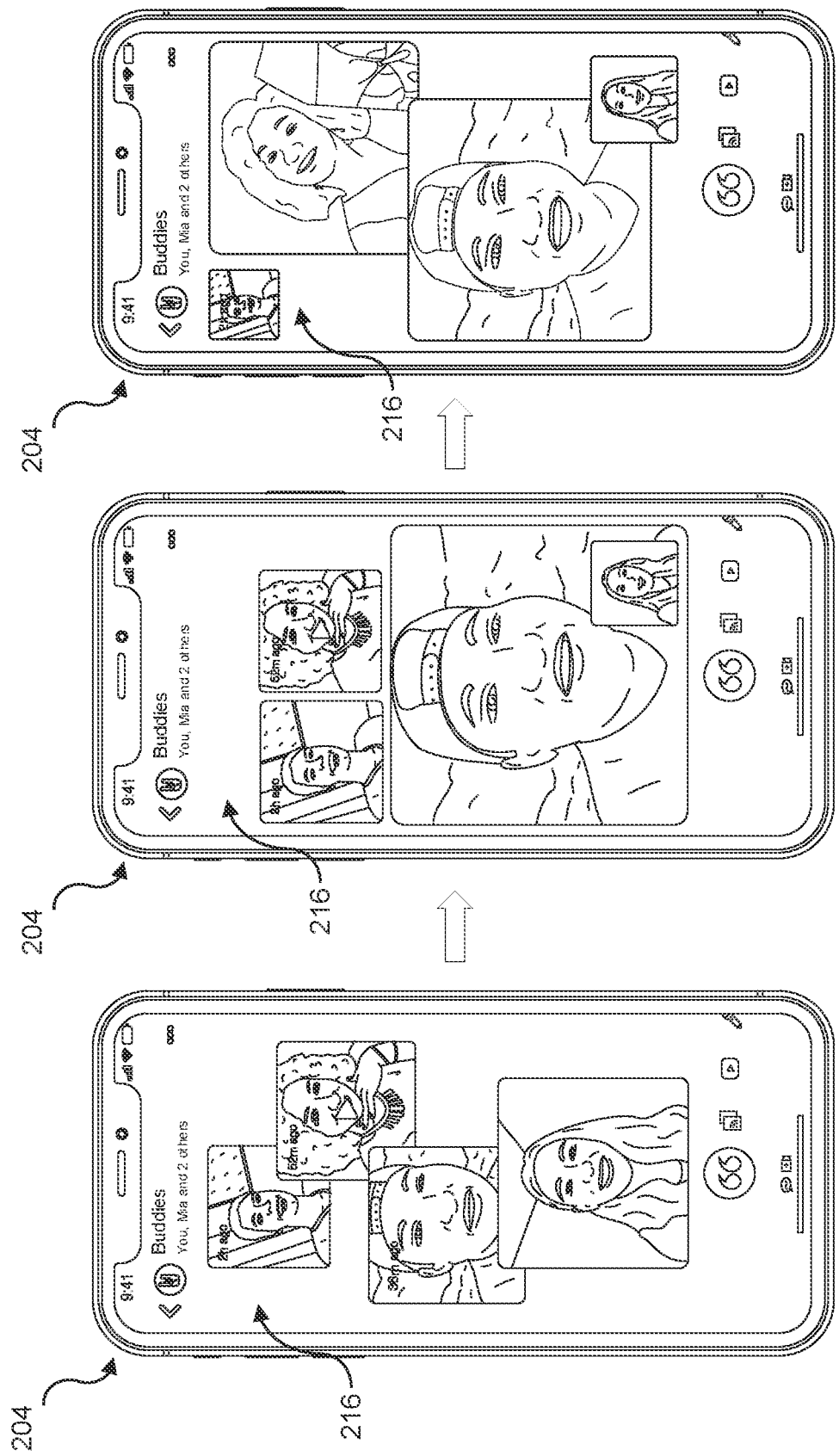
FIG. 6 is an illustration of an exemplary live interface of a digital video room.

In addition, or as an alternative, to changing positions, dynamic user tiles may change size within live interface 216 based on an activity metric. For example, the dynamic user tile of a user who is not currently logged into group streaming space 218 may appear smaller than the dynamic user tile of a user who is. Similarly, the dynamic user tile of a user who is currently speaking may appear larger than the dynamic user tile of a user who is logged in but not currently speaking. FIG. 6 illustrates live interface 216 in an exemplary embodiment in which dynamic user tiles change position and size as additional users join a live videoconference.

Figure 7:
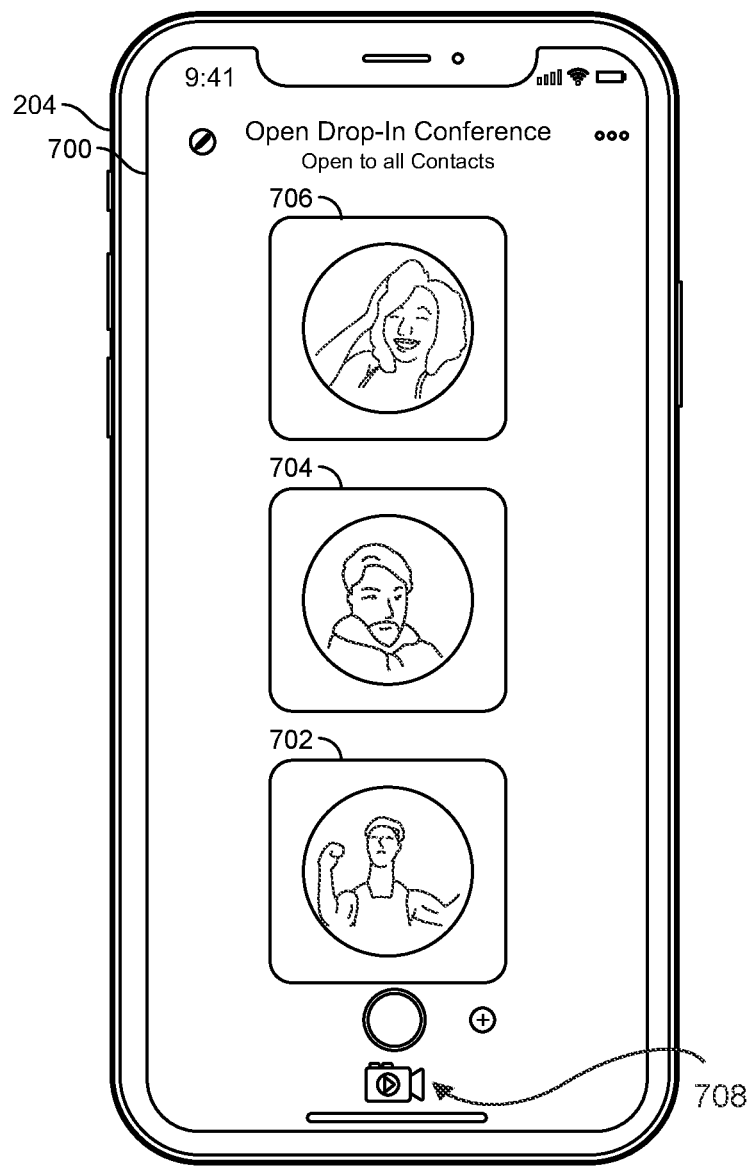
FIG. 7 is an illustration of an additional exemplary live interface of a digital video room.
Figure 8:
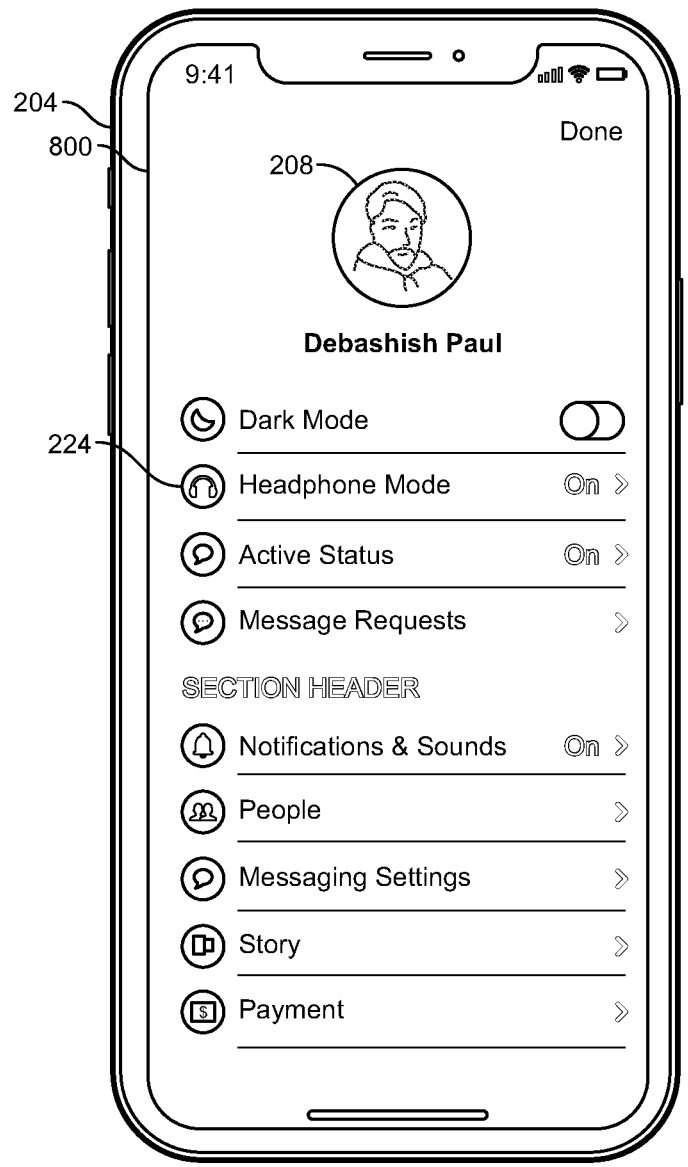
FIG. 8 is an illustration of exemplary settings interface for selecting a messaging mode within a messaging application.

In additional or alternative examples, live interface 216 may include user tiles that are statically positioned and/or sized, as shown in FIG. 7, in which a live interface 700 includes static user tiles 702, 704, and 706. In some examples, user tiles of live interface 216 may stream video of a corresponding user (as shown in FIG. 6). Alternatively, in embodiments in which live interface 216 is used to stream an audio-only conference, the user tile may depict a user's profile and/or may visually indicate if the user is speaking (e.g., via an animation such as an animation of an undulating wave, a change in color, a change in contrast, etc.) without streaming video content (as shown in FIG. 7).

In some examples, group streaming space 218 may enable users to stream group content, in addition to streaming live user streams (e.g., in response to receiving user input from a user such as user 208 providing and/or selecting a link to the group content). Examples of group content may include, without limitation, a webpage and/or a film. Streaming group content in addition to live user streams may enable a variety of virtual group activities, such as group shopping, a group discussion of a presentation, and/or group watching of a broadcast and/or film. Such virtual group activities may mimic real-world engagement by enabling participants to simultaneously view both the group content and a live stream of the other users responding to the group content.

In some examples in which the disclosed digital conferencing service is integrated with other services of social networking platform 206, a digital video room may be automatically created (e.g., by a creation module) for a group of users in response to determining that the users have formed a digital association (e.g., a group) via one of the other services of social networking platform 206. In one such example, a digital video room may automatically be created for each digital thread created and/or maintained via social networking platform 206, automatically configuring a digital video room with a membership that includes and/or consists of the members and/or participants of its corresponding digital thread. The term "digital thread" may refer to any series of related digital exchanges (e.g., a thread of messages in a group chat of a messaging application and/or a group text and/or a thread of comments responding to a digital social media post). Using FIG. 3 as a specific example, a "Buddies" digital video room may automatically be created for the group users of private message thread 300. Additionally and/or alternatively, a digital video room may be created in response to user input directly requesting the same.

In one embodiment, as will be described in greater detail below in connection with steps 110-140, an open drop-in digital video room may be created for a user of a messaging service. In this embodiment, the user may enable other users (e.g., the user's contacts) to access the digital video room by selecting a drop-in mode. In some embodiments, an open drop-in digital video room may be created for each user of the messaging service. In other embodiments, an open drop-in digital video room may be created in response to user input. FIG. 7 depicts an exemplary live interface 700 of an open drop-in digital video room streaming audio content for an open audioconference (i.e., drop-in conference).

Returning to FIG. 1, at step 110, one or more of the systems described herein may detect that a user of a messaging application, which enables audioconferencing between its users, has selected a drop-in mode that enables audioconferencing between (1) the user and (2) other users with access to a drop-in link corresponding to the user. For example, as illustrated in FIG. 2, a detection module 220 may detect that user 208 of messaging application 210, which enables audioconferencing between its users, has selected a drop-in mode 222 that enables audioconferencing between (1) user 208 and (2) other users with access to a drop-in link 224 corresponding to user 208 (e.g., a contact of user 208 such as contact 226).

Detection module 220 may detect the user selection of drop-in mode 222 in a variety of ways. In some examples, detection module 220 may receive the user selection via a settings interface, such as interface 800 depicted in FIG. 8. In some examples, messaging application 210 may enables its users to select various modes for using messaging application 210 (e.g., via a settings interface). For example, messaging application 210 may enable a user to select (1) an open chat mode, in which text-based chatting is enabled for the user and the user appears as available in contact lists of the user's contacts, (e.g., by selecting an on-state for "Activity Status" in FIG. 8), (2) a closed (e.g., incognito) mode, in which the user may view content (e.g., digital message threads) but in which the user does not appear as available or appears as unavailable in the contact lists of the user's contacts, (e.g., by selecting an off-state for "Activity Status" in FIG. 8), and/or (3) drop-in mode 222 (i.e., a headphone mode), in which open audioconferencing (i.e., drop-in audioconferencing) is enabled for the user and the user appears as available for open audioconferencing in the contact lists of the user's contacts (e.g., by selecting an on-state for "Headphone Mode" in FIG. 8).

The term "open audioconferencing" may refer to an audioconference of a messaging service, corresponding to a specific user, that the specific user's contacts may join without being personally approved for joining, by the specific user, prior to joining. By way of example, when a contact of a user attempts to join an open audioconference of the user, the messaging service may add the contact to the open audioconference in response to the attempt, without presenting the user with a prompt to permit the access. In some examples, as will be described in greater detail in connection with step 120, an open audioconference of a user may only be accessible via a selectable element (e.g., embedded with drop-in link 224) provided within a contacts list (e.g., alongside an entry of the contacts list for the user).

In response to detecting that user 208 has selected drop-in mode 222, detection module 220 may enable drop-in mode 222 in a variety of ways. In some examples, detection module 220 may enable drop-in mode 222 by creating a drop-in digital video room for user 208. In other examples, a drop-in digital video room may have already been created for user 208. For example, a drop-in digital video room may have been automatically created for user 208 and/or may have been created in response to previous user input. In one such example, a drop-in digital video room may automatically be created for each user of messaging application 210 but may only be accessible to a user's contacts when the user selects to use messaging application 210 in drop-in mode.

A drop-in digital video room may include any of the features described above in connection with digital video room 212. For example, a drop-in digital video room may include a lobby interface, a live interface, etc. In one embodiment, a drop-in digital video room may include all of the features of digital video room 212 described above. Alternatively, a drop-in digital video room may only include a subset of such features (e.g., may enable live conferencing via a live interface but no lobby state features). In some examples, a drop-in digital video room may enable open audioconferencing (e.g. via a live interface of the drop-in digital video room such as live interface 700 depicted in FIG. 7). Alternatively, an open audioconference may be enabled without the use of a drop-in digital video room (e.g., via a messaging interface of messaging application 210).

In some examples, a drop-in digital video room and/or an open audioconference may be configured for one specific user and may only enable persistent (e.g., non-expiring) access for the specific user. In these examples, the selection of drop-in mode 222 may enable other users to ephemerally access the drop-in digital video room and/or the open audioconference (e.g., as long as drop-in mode 222 is selected and the specific user is logged into messaging application 210). In one embodiment in which drop-in mode 222 is associated with a drop-in digital video room, the ephemeral access may enable the other users to access all aspects (e.g., all interfaces) of the drop-in digital video room. In another embodiment, the ephemeral access may only afford the other users with a partial access. For example, the ephemeral access may enable the other users to access a live interface and/or a lobby interface of the drop-in digital video room but not a lobby-archive interface. As another example, the ephemeral access may enable the other users to join an open audioconference (and/or to access a videoconference corresponding to the open audioconference) but may not enable any other type of access.

Returning to FIG. 1, at step 120, one or more of the systems described herein may provide the drop-in link to contacts of the user in a messaging interface of the messaging application. For example, as illustrated in FIG. 2, a link module 228 may provide drop-in link 224 to contacts of user 208 (e.g., contact 226) in a messaging interface 230 presented via an instance of messaging application 210 within a display element of a user device 232 of contact 226.

Messaging interface 230 may generally refer to any type or form of interface provided by messaging application 210. In some examples, messaging interface 230 may represent a contact summary interface and/or may include a contact list of a user's contacts within messaging application 210. FIG. 4 illustrates messaging interface 230 in an exemplary embodiment in which messaging interface 230 represents a contact summary interface. In these examples, link module 228 may provide drop-in link 224 to the contacts of user 208 (e.g. contact 226) within and/or alongside an entry of the contact list corresponding to user 208, as illustrated in FIG. 4.

In one embodiment, messaging interface 230 (e.g., a contact summary interface) may represent the only entry point for accessing an open audioconference and/or a drop-in digital video room corresponding to an open audioconference. In this embodiment, the messaging service may maintain a level of privacy for an open audioconference (e.g., limiting those able to join to a corresponding user's contacts) without requiring the user to manually impose such privacy by gatekeeping (e.g., by being required to either have no limit on entry and/or to limit entry by manually granting or denying access to each user attempting to join).

Drop-in link 224 may take a variety of forms. In some examples, drop-in link 224 may be embedded with a graphic, such as a graphic of headphones as depicted in FIG. 4. Additionally or alternatively, drop-in link may take the form of a hyperlink.

Returning to FIG. 1, at step 130, one or more of the systems described herein may, in response to determining that a contact of the user has selected the drop-in link, automatically initiate an audioconference between the user and the contact. For example, as illustrated in FIG. 2, link module 228 may, in response to determining that contact 226 has selected drop-in link 224, automatically initiate an open audioconference 234 between a user account of user 208 and a user account of contact 226.

Link module 228 may initiate open audioconference 234 between user 208 and contact 226 in a variety of ways. In some examples, user 208 may have already been added to open audioconference 234 (e.g., user 208 may have been added in response to selecting drop-in mode 222). In these examples, link module 228 may initiate open audioconference 234 by additionally adding contact 226 to open audioconference 234. In some embodiments, link module 228 may add contact 226 without obtaining approval from user 208 specifically approving that contact 226 be added to open audioconference 234. In one embodiment, link module 228 may be configured to alert user 208 that contact 226 has been added to open audioconference 234 (e.g., via an audio alert and/or a visual prompt). In another embodiment, link module 228 may be configured to add contact 226 without any alert, enhancing a sense of spontaneity and/or serendipity. In this embodiment, user 208 may access a list of all users added to open audioconference 234 via an interface (e.g., a live interface corresponding to open audioconference 234 such as live interface 700 in FIG. 7).

In some examples, contact 226 may represent the only contact of user 208 to select drop-in link 224 during a given period. In these examples, a two-way audioconference may be maintained for user 208 and contact 226 during the period. In other examples, multiple contacts may select drop-in link 224 during the period. In these examples, link module 228 may maintain a group audioconference for the multiple contacts by automatically adding each of the contacts to open audioconference 234.

In certain examples, link module 228 may identify audio content (e.g., music, a podcast, etc.) being digitally consumed by user 208 via speakers (e.g., headphones) communicatively coupled to user device 204. In these examples, in response to a contact being added to open audioconference 234, link module 228 may automatically stream the identified audio content to a device of the contact (e.g., to user device 232 of contact 226) to be played via speakers of the contact's device, giving the contact the impression of having been dropped into the user's space (e.g., into the user's headphones). The identified audio content may be streamed in addition to the audio streams of users logged into open audioconference 234. For example, open audioconference 234 may stream (1) audio picked up from a microphone of user device 204, (2) audio being played to speakers of (e.g., communicatively coupled to) user device 204, and (3) audio picked up from the microphones of the devices of the contacts participating in open audioconference 234 (e.g., from a microphone of user device 232).

Figure 9:
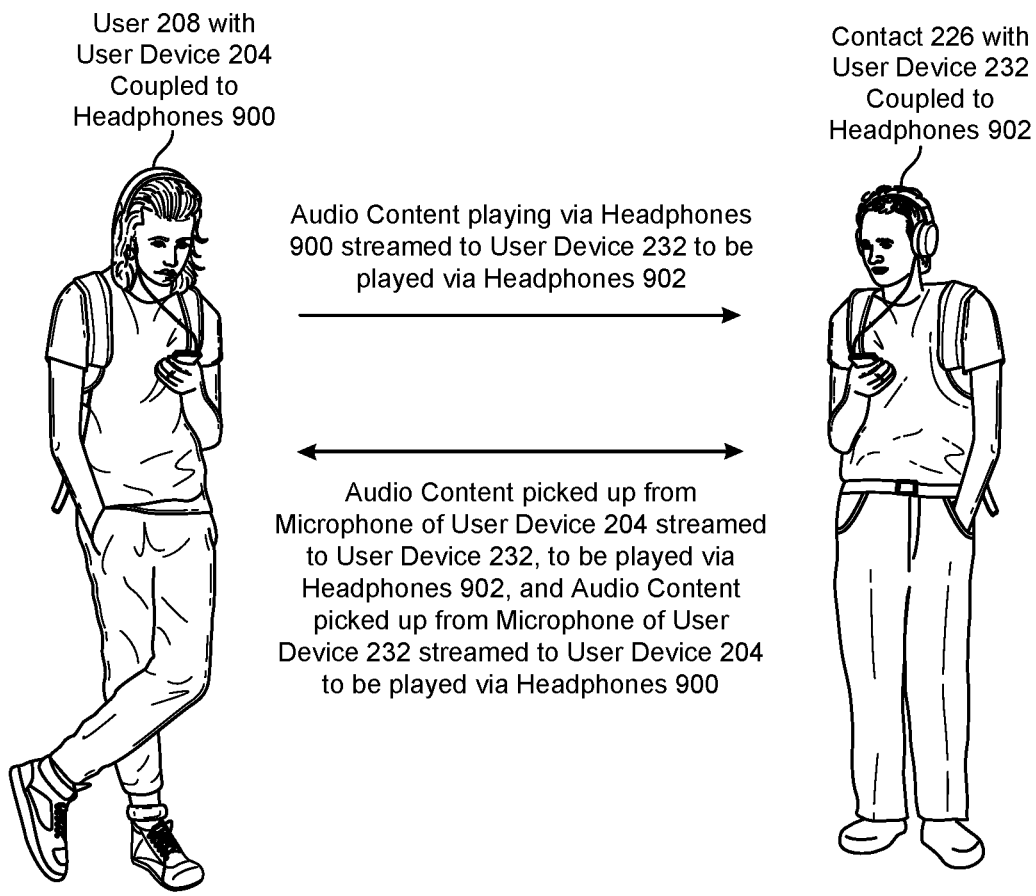
FIG. 9 is an illustration of an exemplary audio content exchange between devices in an open audioconference.

FIG. 9 illustrates an exemplary embodiment in which (1) audio content being played via headphones 900 communicatively coupled to user device 204 is streamed to user device 232 (i.e. to be played via headphones 902 communicatively coupled to user device 232), (2) audio content picked up from a microphone of user device 204 is streamed to user device 232 (i.e., to be played via headphones 902), and (3) audio content picked up from a microphone of user device 232 is streamed to user device 204 (i.e., to be played via headphones 900). In this embodiment, each source of audio content may be simultaneously streamed via open audioconference 234.

In some examples (e.g., examples in which open audioconference 234 is hosted via a drop-in digital video room), the disclosed systems and methods may enable users participating in open audioconference 234 to transition (e.g., upgrade) from participating in an audio-only conference to participating in a videoconference (e.g., by selecting an element in an interface used to stream open audioconference 234 such as element 708 depicted in FIG. 7). In such examples, new contacts joining after the transition may be joined via an audio-only audioconference corresponding to the videoconference (sending and receiving only audio streams) and may be enabled to transition to joining the full videoconference (e.g., via user input selecting to send and/or receive video streams).

EXAMPLE EMBODIMENTS

Example 1: A computer-implemented method may include (1) detecting that a user of a messaging application, which enables audioconferencing between its users, has selected a drop-in mode that enables audioconferencing between (i) the user and (ii) other users with access to a drop-in link corresponding to the user, (2) providing the drop-in link to contacts of the user in a messaging interface of the messaging application, and (3) in response to determining that a contact of the user has selected the drop-in link, automatically initiating an audioconference between the user and the contact.

Example 2: The computer-implemented method of example 1, where (1) the messaging interface includes a contact list of users of the messaging application and (2) providing the drop-in link includes providing the drop-in link within an entry of the contact list corresponding to the user.

Example 3: The computer-implemented method of examples 1-2, where automatically initiating the audioconference includes adding the contact to the audioconference without obtaining approval from the user specifically approving the contact to be added to the audioconference.

Example 4: The computer-implemented method of examples 1-3, further including (1) determining that a plurality of contacts of the user, including the contact, have selected the drop-in link and (2) in response to determining that the plurality of contacts have selected the drop-in link, hosting a group audioconference between the user and the plurality of contacts by automatically adding each of the contacts to the audioconference.

Example 5: The computer-implemented method of examples 1-4, further including (1) identifying audio content being digitally consumed by the user and (2) streaming the audio content to a device of the contact.

Example 6: The computer-implemented method of example 5, where the audio content includes at least one of music or a podcast.

Example 7: The computer-implemented method of examples 1-6, where the drop-in link includes a graphic of headphones.

Example 8: The computer-implemented method of examples 1-7, further including enabling users participating in the audioconference to transition to participating in a videoconference.

Example 9: A system for implementing the above-described method may include at least one physical processor and physical memory that includes computer-executable instructions that, when executed by the physical processor, cause the physical processor to (1) detect that a user of a messaging application, which enables audioconferencing between its users, has selected a drop-in mode that enables audioconferencing between (i) the user and (ii) other users with access to a drop-in link corresponding to the user, (2) provide the drop-in link to contacts of the user in a messaging interface of the messaging application, and (3) in response to determining that a contact of the user has selected the drop-in link, automatically initiate an audioconference between the user and the contact.

Example 10: The system of example 9, where (1) the messaging interface includes a contact list of users of the messaging application and (2) providing the drop-in link includes providing the drop-in link within an entry of the contact list corresponding to the user.

Example 11: The system of examples 9-10, where automatically initiating the audioconference includes adding the contact to the audioconference without obtaining approval from the user specifically approving the contact to be added to the audioconference.

Example 12: The system of examples 9-11, where the computer-executable instructions further cause the physical processor to (1) determine that a plurality of contacts of the user, including the contact, have selected the drop-in link and (2) in response to determining that the plurality of contacts have selected the drop-in link, host a group audioconference between the user and the plurality of contacts by automatically adding each of the contacts to the audioconference.

Example 13: The system of examples 9-12, where the computer-executable instructions further cause the physical processor to (1) identify audio content being digitally consumed by the user and (2) stream the audio content to a device of the contact.

Example 14: The system of example 13, where the audio content includes at least one of music or a podcast.

Example 15: The system of examples 9-14, where the drop-in link includes and/or is embedded within a graphic of headphones.

Example 16: The system of examples 9-15, where the computer-executable instructions further cause the physical processor to enable users participating in the audioconference to transition to participating in a videoconference.

Example 17: A non-transitory computer-readable medium may include one or more computer-readable instructions that, when executed by at least one processor of a computing device, cause the computing device to (1) detect that a user of a messaging application, which enables audioconferencing between its users, has selected a drop-in mode that enables audioconferencing between (i) the user and (ii) other users with access to a drop-in link corresponding to the user, (2) provide the drop-in link to contacts of the user in a messaging interface of the messaging application, and (3) in response to determining that a contact of the user has selected the drop-in link, automatically initiate an audioconference between the user and the contact.

Example 18: The non-transitory computer-readable medium of example 17, where (1) the messaging interface includes a contact list of users of the messaging application and (2) providing the drop-in link includes providing the drop-in link within an entry of the contact list corresponding to the user.

Example 19: The non-transitory computer-readable medium of examples 17-18, where the one or more computer-readable instructions further cause the computing device to (1) identify audio content being digitally consumed by the user and (2) stream the audio content to a device of the contact.

Example 20: The non-transitory computer-readable medium of example 17-19, where the drop-in link includes a graphic of headphones.

As detailed above, the computing devices and systems described and/or illustrated herein broadly represent any type or form of computing device or system capable of executing computer-readable instructions, such as those contained within the modules described herein. In their most basic configuration, these computing device(s) may each include at least one memory device (e.g., memory device 236 and 238) and at least one physical processor (e.g., physical processor 240 and 242).

The term "memory device" generally represents any type or form of volatile or non-volatile storage device or medium capable of storing data and/or computer-readable instructions. In one example, a memory device may store, load, and/or maintain one or more of the modules described herein. Examples of memory devices include, without limitation, Random Access Memory (RAM), Read Only Memory (ROM), flash memory, Hard Disk Drives (HDDs), Solid-State Drives (SSDs), optical disk drives, caches, variations or combinations of one or more of the same, or any other suitable storage memory.

In addition, the term "physical processor" generally refers to any type or form of hardware-implemented processing unit capable of interpreting and/or executing computer-readable instructions. In one example, a physical processor may access and/or modify one or more modules stored in the above-described memory device. Examples of physical processors include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, or any other suitable physical processor.

Although illustrated as separate elements, the modules described and/or illustrated herein may represent portions of a single module or application. In addition, in certain embodiments one or more of these modules may represent one or more software applications or programs that, when executed by a computing device, may cause the computing device to perform one or more tasks. For example, one or more of the modules described and/or illustrated herein may represent modules stored and configured to run on one or more of the computing devices or systems described and/or illustrated herein. One or more of these modules may also represent all or portions of one or more special-purpose computers configured to perform one or more tasks.

In addition, one or more of the modules described herein may transform data, physical devices, and/or representations of physical devices from one form to another. For example, one or more of the modules recited herein may transform a processor, volatile memory, non-volatile memory, and/or any other portion of a physical computing device from one form to another by executing on the computing device, storing data on the computing device, and/or otherwise interacting with the computing device.

The term "computer-readable medium" may refer to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method comprising:
    detecting that a certain user of a messaging application, which enables audioconferencing between its users, has selected a drop-in mode that enables audioconferencing between (1) the certain user and (2) other users with access to a drop-in link corresponding to the certain user;
    providing the drop-in link to contacts of the certain user in a messaging interface of the messaging application, wherein (1) the messaging interface comprises a contact list of users of the messaging application, (2) providing the drop-in link in the messaging interface comprises providing the drop-in link within an entry of the contact list corresponding to the certain user, and (3) providing the drop-in link to contacts of the certain user comprises providing the drop-in link to all of the certain user's contacts; and
    in response to determining that a contact of the certain user has selected the drop-in link, automatically initiating an audioconference between the certain user and the contact.

2. The computer-implemented method of claim 1, wherein (1) the messaging interface comprises a contact summary interface and (2) the messaging application provides each user of the messaging application with an instance of the messaging interface in which the contact list comprises contacts of the user, and (3) providing the drop-in link to all of the certain user's contacts comprises providing the drop-in link to each contact for which there is an entry for the certain user with the contact list of the instance of messaging interface configured for the contact.

3. The computer-implemented method of claim 1, wherein automatically initiating the audioconference comprises adding the contact to the audioconference without obtaining approval from the certain user specifically approving the contact to be added to the audioconference.

4. The computer-implemented method of claim 1, further comprising:
    determining that a plurality of contacts of the certain user, comprising the contact, have selected the drop-in link; and
    in response to determining that the plurality of contacts have selected the drop-in link, hosting a group audioconference between the certain user and the plurality of contacts by automatically adding each of the contacts to the audioconference.

5. The computer-implemented method of claim 1, further comprising:
    identifying audio content being digitally consumed by the certain user; and
    streaming the audio content to a device of the contact.

6. The computer-implemented method of claim 5, wherein the audio content comprises at least one of music or a podcast.

7. The computer-implemented method of claim 1, wherein the drop-in link comprises a graphic of headphones.

8. The computer-implemented method of claim 1, further comprising enabling users participating in the audioconference to transition to participating in a videoconference.

9. A system comprising:
    at least one physical processor;
    physical memory comprising computer-executable instructions that, when executed by the physical processor, cause the physical processor to:
        detect that a certain user of a messaging application, which enables audioconferencing between its users, has selected a drop-in mode that enables audioconferencing between (1) the certain user and (2) other users with access to a drop-in link corresponding to the certain user;
        provide the drop-in link to contacts of the certain user in a messaging interface of the messaging application, wherein (1) the messaging interface comprises a contact list of users of the messaging application, (2) providing the drop-in link in the messaging interface comprises providing the drop-in link within an entry of the contact list corresponding to the certain user, and (3) providing the drop-in link to contacts of the certain user comprises providing the drop-in link to all of the certain user's contacts; and
        in response to determining that a contact of the certain user has selected the drop-in link, automatically initiate an audioconference between the certain user and the contact.

10. The system of claim 9, wherein (1) the messaging interface comprises a contact summary interface, (2) the messaging application provides each user of the messaging application with an instance of the messaging interface in which the contact list comprises contacts of the user, and (3) providing the drop-in link to all of the certain user's contacts comprises providing the drop-in link to each contact for which there is an entry for the certain user with the contact list of the instance of the messaging interface configured for the contact.

11. The system of claim 9, wherein automatically initiating the audioconference comprises adding the contact to the audioconference without obtaining approval from the certain user specifically approving the contact to be added to the audioconference.

12. The system of claim 9, wherein the computer-executable instructions further cause the physical processor to:
   determine that a plurality of contacts of the certain user, comprising the contact, have selected the drop-in link; and
   in response to determining that the plurality of contacts have selected the drop-in link, host a group audioconference between the certain user and the plurality of contacts by automatically adding each of the contacts to the audioconference.

13. The system of claim 9, wherein the computer-executable instructions further cause the physical processor to:
   Identify audio content being digitally consumed by the certain user; and
   stream the audio content to a device of the contact.

14. The system of claim 13, wherein the audio content comprises at least one of music or a podcast.

15. The system of claim 9, wherein the drop-in link comprises a graphic of headphones.

16. The system of claim 9, wherein the computer-executable instructions further cause the physical processor to enable users participating in the audioconference to transition to participating in a videoconference.

17. A non-transitory computer-readable medium comprising one or more computer-readable instructions that, when executed by at least one processor of a computing device, cause the computing device to:
   detect that a certain user of a messaging application, which enables audioconferencing between its users, has selected a drop-in mode that enables audioconferencing between (1) the certain user and (2) other users with access to a drop-in link corresponding to the certain user;
   provide the drop-in link to contacts of the certain user in a messaging interface of the messaging application, wherein (1) the messaging interface comprises a contact list of users of the messaging application, (2) providing the drop-in link in the messaging interface comprises providing the drop-in link within an entry of the contact list corresponding to the certain user, and (3) providing the drop-in link to contacts of the certain user comprises providing the drop-in link to all of the certain user's contacts; and
   in response to determining that a contact of the certain user has selected the drop-in link, automatically initiate an audioconference between the certain user and the contact.

18. The non-transitory computer-readable medium of claim 17, wherein (1) the messaging interface comprises a contact summary interface, (2) the messaging application provides each user of the messaging application with an instance of the messaging interface in which the contact list comprises contacts of the user, and (3) providing the drop-in link to all of the certain user's contacts comprises providing the drop-in link to each contact for which there is an entry for the certain user with the contact list of the instance of the messaging interface configured for the contact.

19. The non-transitory computer-readable medium of claim 17, wherein the one or more computer-readable instructions further cause the computing device to:
   identify audio content being digitally consumed by the certain user; and
   stream the audio content to a device of the contact.

20. The non-transitory computer-readable medium of claim 17, wherein the drop-in link comprises a graphic of headphones.

* * * * *